US009480066B2

(12) United States Patent
Thanayankizil et al.

(10) Patent No.: US 9,480,066 B2
(45) Date of Patent: Oct. 25, 2016

(54) LOCATION-CONTROLLED WI-FI MODULE

(71) Applicants: General Motors LLC, Detroit, MI (US); GM Global Technology Operations LLC, Detroit, MI (US)

(72) Inventors: Lakshmi V. Thanayankizil, Rochester Hills, MI (US); Mohammad Ishfaq, Northville, MI (US); Curtis L. Hay, West Bloomfield, MI (US); Dipankar Pal, Sylvania, OH (US)

(73) Assignees: General Motors LLC, Detroit, MI (US); GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/660,553

(22) Filed: Mar. 17, 2015

(65) Prior Publication Data

US 2016/0278087 A1  Sep. 22, 2016

(51) Int. Cl.
*H04W 24/00* (2009.01)
*H04W 72/04* (2009.01)
*H04B 1/3822* (2015.01)
*H04W 4/02* (2009.01)
*H04W 4/06* (2009.01)
*H04W 64/00* (2009.01)
*H04M 1/60* (2006.01)

(52) U.S. Cl.
CPC ....... *H04W 72/0453* (2013.01); *H04B 1/3822* (2013.01); *H04M 1/6066* (2013.01); *H04W 4/021* (2013.01); *H04W 4/06* (2013.01); *H04W 64/00* (2013.01)

(58) Field of Classification Search
CPC . H04W 72/0453; H04W 4/021; H04W 4/06; H04W 64/00; H04B 1/3822; H04M 1/6066
USPC ......... 455/456.1, 456.3, 414.1, 414.2, 556.1, 455/569.2
See application file for complete search history.

(56) References Cited

U.S. PATENT DOCUMENTS

| | | | | |
|---|---|---|---|---|
| 2005/0017851 A1* | 1/2005 | Allison | ..................... | G08G 1/20 340/425.5 |
| 2009/0258645 A1* | 10/2009 | Ramkull | ............... | H04W 48/16 455/434 |
| 2009/0325596 A1* | 12/2009 | Oesterling | ............... | H04W 4/20 455/456.1 |
| 2014/0172573 A1* | 6/2014 | Saurabh | ............. | G06Q 30/0261 705/14.58 |
| 2014/0342732 A1* | 11/2014 | Manalo | ................... | H04W 8/06 455/433 |
| 2015/0163832 A1* | 6/2015 | Hosey | ................. | H04W 76/007 455/404.2 |

* cited by examiner

*Primary Examiner* — Khai M Nguyen
(74) *Attorney, Agent, or Firm* — Christopher DeVries; Reising Ethington P.C.

(57) ABSTRACT

A system and method of controlling Wi-Fi module operation based on vehicle location includes: detecting at a vehicle a geopolitical identifier broadcast by a wireless carrier system; determining whether operational settings of the Wi-Fi module conform to operational settings specified for the detected geopolitical identifier; and changing the operational settings of the Wi-Fi module when not conforming to the operational settings specified for the detected geopolitical identifier.

20 Claims, 2 Drawing Sheets

LOCATION-CONTROLLED WI-FI MODULE

TECHNICAL FIELD

The present invention relates to the operation of Wi-Fi modules and, more particularly, to controlling the operation of Wi-Fi modules based on the location of the Wi-Fi modules.

BACKGROUND

Modern vehicles often include a variety of electronic devices that provide wireless communications. These electronic devices can include vehicle telematics units that communicate using a cellular communication system. Other examples of electronic devices include Wi-Fi modules that can provide wireless Internet access to wireless devices located nearby the vehicle. The wireless devices can communicate data with the Internet via the Wi-Fi modules using various short-range wireless communication protocols. The Wi-Fi modules ultimately carry communications between the Internet and the wireless devices using the cellular communication system. The vehicles featuring these electronic devices may be sold in a large number of different areas and each area may legally specify operating parameters for the electronic devices. Determining the destination of individual vehicles among a stream of vehicles manufactured in an assembly facility and then specifying operating parameters for the vehicle electronics for each vehicle based on this determination can be overly complex. A mechanism that controls the operating parameters of vehicle electronic devices based on vehicle location can simplify vehicle assembly.

SUMMARY

According to an embodiment of the invention, there is provided a method of controlling Wi-Fi module operation based on vehicle location. The method includes detecting at a vehicle a geopolitical identifier broadcast by a wireless carrier system; determining whether operational settings of the Wi-Fi module conform to operational settings specified for the detected geopolitical identifier; and changing the operational settings of the Wi-Fi module when not conforming to the operational settings specified for the detected geopolitical identifier.

According to another embodiment of the invention, there is provided a method of controlling Wi-Fi module operation based on vehicle location. The method includes storing a geopolitical identifier at a vehicle; detecting at the vehicle a geopolitical identifier broadcast by a wireless carrier system; comparing the stored geopolitical identifier with the detected geopolitical identifier; determining whether operational settings of the Wi-Fi module conform to operational settings specified for the detected geopolitical identifier when the stored geopolitical identifier is different than the detected geopolitical identifier; and changing the operational settings of the Wi-Fi module when not conforming to the operational settings specified for the detected geopolitical identifier.

According to yet another embodiment of the invention, there is provided a system of controlling Wi-Fi module operation based on vehicle location. The system includes a vehicle telematics unit receiving a geopolitical identifier broadcast by a wireless carrier system and determining whether the geopolitical identifier is different from a previously-detected geopolitical identifier; and a Wi-Fi module located in a vehicle and in communication with the vehicle telematics unit. The vehicle telematics unit directs the Wi-Fi module to change its operational settings based on a determination that the received geopolitical identifier is different than the previously-detected geopolitical identifier.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below provides a mechanism for a vehicle to determine its presence within a particular geopolitical boundary using a geopolitical identifier broadcast from a wireless carrier system. Geopolitical boundaries refer to the land boundary of a particular territory—such as a country or group of countries—within which a set of laws or rules are applicable to the operation of Wi-Fi module broadcasts. Geopolitical boundaries as they involve the system and method will be described in terms of a country, but it should be appreciated that the term geopolitical boundaries can be implemented in different ways. Often, each country specifies a number of frequency channels that are acceptable for a Wi-Fi module to use as well as limits on the power levels at which the Wi-Fi module can broadcast signals. Channels and/or power levels acceptable for Wi-Fi modules in one country may not be acceptable when the vehicle moves into a different country. When the vehicle is initially deployed in a particular country or moves from one country to another, the vehicle can determine its location and determine whether its Wi-Fi module conforms to the rules of the country.

The vehicle can identify the country where it is located by receiving the geopolitical identifier broadcast by a wireless carrier system using cellular communications techniques. Based on the broadcast geopolitical identifier, the vehicle can determine the appropriate channels and/or power levels for an on-board Wi-Fi module. Wireless carrier systems or cellular communication systems located within a country can broadcast a geopolitical identifier indicating the particular country where the wireless carrier system is located. Geopolitical identifiers as used herein are numeric or alphanumeric codes signaling that a portion of the wireless carrier system is within a geopolitical boundary. For instance, the vehicle telematics unit can receive a mobile country code (MCC) broadcast by a cell tower belonging to the wireless carrier system. The vehicle telematics unit can identify the country where it is located based on the MCC. Once the vehicle identifies the country where it's located, the vehicle can identify the permitted operational settings for Wi-Fi modules in that country. If the vehicle determines that the Wi-Fi module does not comply with the operational settings for the country where it is located, the Wi-Fi module can be directed to change its settings to comply.

Figure 1:
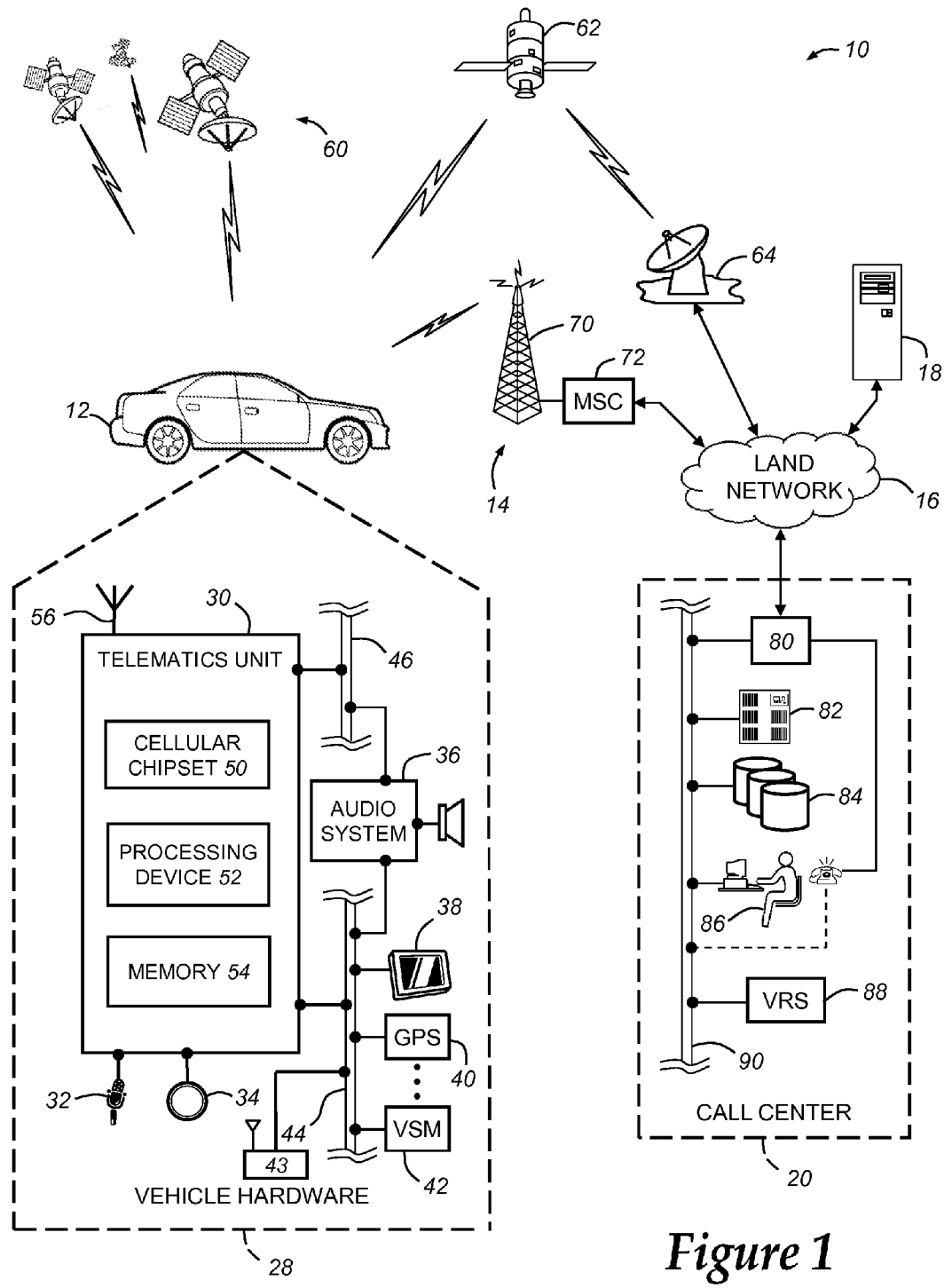
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. When used for packet-switched data communication such as TCP/IP, the telematics unit can be configured with a static IP address or can set up to automatically receive an assigned IP address from another device on the network such as a router or from a network address server.

Wireless networking between the vehicle and other networked devices can also be carried out using a Wi-Fi module 43 and/or the vehicle telematics unit 30. In one implementation, the vehicle telematics unit 30 can be communicatively linked with the Wi-Fi module 43 via the communication bus 42. Using a dedicated antenna, the Wi-Fi module 43 can facilitate wireless data communications between wireless devices nearby the vehicle 12 and the wireless carrier system 14 through the vehicle telematics unit 30. For this purpose, the Wi-Fi module 43 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). Various components can be included with the Wi-Fi module 43, such as the antenna for carrying out SRWC, a microprocessor, a memory device, and/or one or more serial ports.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
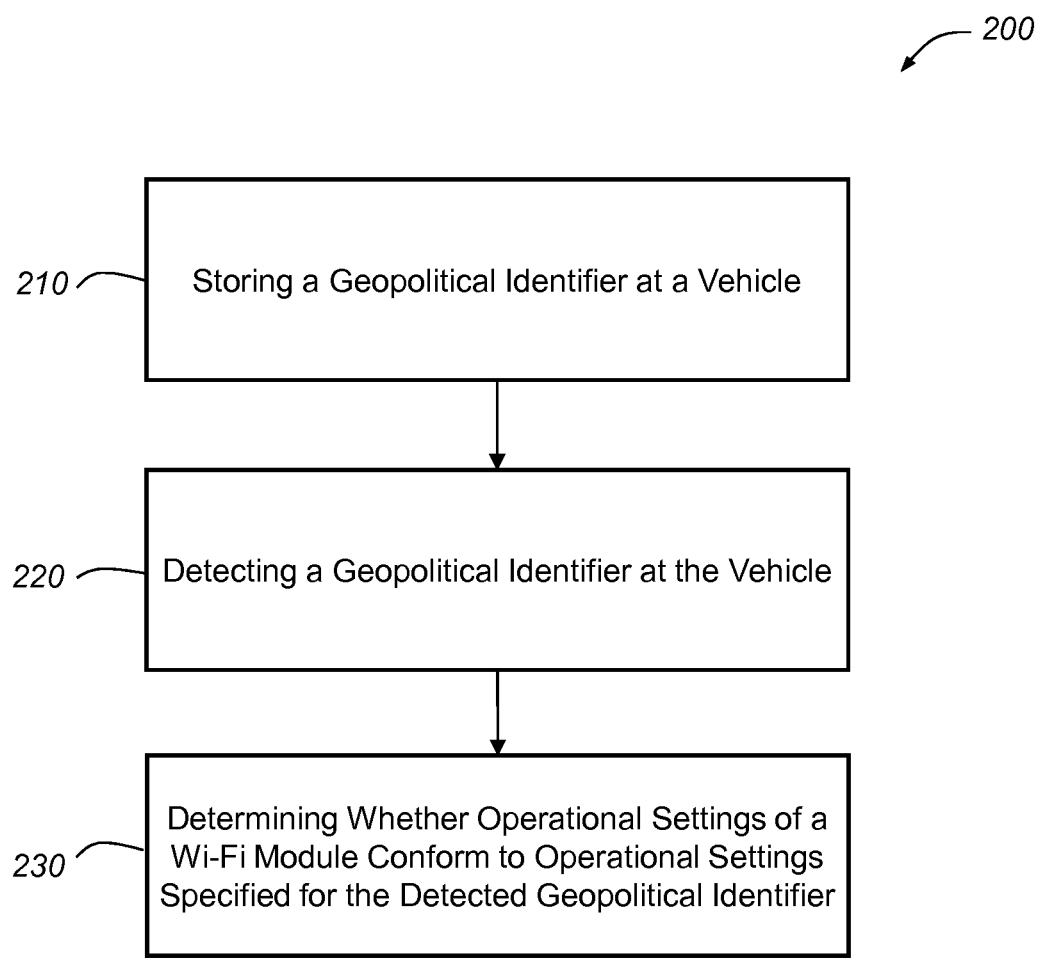
FIG. 2 is a flow chart depicting an embodiment of a method of controlling Wi-Fi module operation based on vehicle location.

Turning now to FIG. 2, there is shown an implementation of a method 200 of controlling Wi-Fi module operation based on vehicle location. The method 200 begins at step 210 by storing a geopolitical identifier at a vehicle 12. This can happen in a variety of ways. For example, vehicles that leave an assembly facility may be initially programmed with a geopolitical identifier, such as a mobile country code (MCC), that represents the geopolitical boundary (e.g., country) where the vehicle will be sold or used. Different countries can each be represented by a unique three-digit MCC. For instance, the United States, Switzerland, and Japan are represented by the MCCs 310, 228, and 440, respectively. Cell towers 70 of the wireless carrier system 14 broadcast the MCC representing the country where the towers 70 and/or the wireless carrier system 14 are located. The MCC can be stored in a non-volatile memory device at the vehicle 12 in addition to a lookup table that includes a plurality of MCCs each correlated with operating settings permitted for Wi-Fi modules. Memory devices 54 are an example of the non-volatile memory device, but it is also possible to store the MCC and lookup table at the Wi-Fi module 43. Alternatively, the lookup table can be stored at a location remote from the vehicle 12, such as at computer 18 or call center 20. The vehicle telematics unit 30 can transmit an MCC to the remote location and receive from the remote location operational settings associated with the MCC.

After delivery, the vehicle telematics unit 30 or the Wi-Fi module 43 can access the stored MCC to determine the appropriate operational settings for the Wi-Fi module 43 to use. Using the lookup table stored at the vehicle 12, the vehicle telematics unit 30 can compare the stored MCC with the MCCs included in the lookup table. When a match is found, the vehicle telematics unit 30 can access the operational settings permitted by the country represented by the stored MCC. The Wi-Fi module 43 can then be programmed to operate in accordance with the operational settings permitted. Operational settings of the Wi-Fi module 43 include the identity of channels available for use by the Wi-Fi module 43 and the broadcast power level the module 43 can use. The operating settings can be specified for the frequency band(s) used by the Wi-Fi module 43. The lookup table can include operating settings for each individual frequency band able to be used in each country. For example, Wi-Fi modules operating in the 2.4 GHz band in the United States can use channels 1-11 whereas Japan allows use of channels 1-13. Upon detecting the cell tower 70 broadcasting the MCC code 310 (United States), the vehicle telematics unit 30 can direct a Wi-Fi module 43 operating the 2.4 GHz band to use channels 1-11. In contrast, if the vehicle telematics unit 30 detected the MCC code 440 (Japan), it could direct the Wi-Fi module 43 to use channels 1-13. In another example, Wi-Fi modules operating in the 5 GHz frequency band can use channel 100 in both the United States and Switzerland. However, the United States does not limit the broadcast power level for Wi-Fi modules using channel 100 whereas Switzerland limits power to 100 mW rather than a usual value of 200 mW. When the vehicle telematics unit 30 detects the MCC 228 (Switzerland), it can direct the Wi-Fi module 43 to limit the power at which it broadcasts over channel 100 to 100 mW.

In another implementation, the vehicle 12 can leave the assembly facility without initially storing a particular MCC indicating where the vehicle will be delivered. Instead, the lookup table including a plurality of MCCs each correlated with operating conditions can be stored at the vehicle 12 and, when delivered, the vehicle telematics unit 30 can detect a locally-broadcast MCC and use the lookup table to identify the Wi-Fi module operating conditions for the present location. This will be discussed in more detail below. The method 200 proceeds to step 220.

At step 220, an MCC broadcast by the wireless carrier system 14 is detected at the vehicle 12. Regardless of whether an MCC was previously stored at the vehicle 12, the vehicle telematics unit 30 can receive an MCC broadcast by the cell tower 70 and use it to determine the appropriate operating conditions for the Wi-Fi module 43. The vehicle telematics unit 30 can receive wireless broadcasts from cell tower 70 operated by the wireless carrier system 14. As part of communicating with the cell tower 70, the vehicle telematics unit 30 receives information that identifies the country where the vehicle 12 is located as well as the identity of the wireless carrier system 14 that the cell tower 70 belongs to. This information includes items such as a system identifier (SID) code and/or an MCC that the vehicle telematics unit 30 can read and use to specify the operational settings for the Wi-Fi module 43. The SID can indicate the particular wireless carrier used at that location by the cell tower 70 broadcasting the SID. The method 200 proceeds to step 230.

At step 230, it is determined whether operational settings of the Wi-Fi module 43 conform to operational settings specified for the detected MCC. After detecting the MCC broadcast by a nearby cell tower 70, the vehicle telematics unit 30 can use the MCC to ensure that the Wi-Fi module 43 is operating with the appropriate operational settings. If an MCC has not been previously stored at the vehicle 12, the vehicle telematics unit 30 can identify the frequency band the Wi-Fi module 43 is using, and use the MCC to access operational settings for that particular country. The Wi-Fi module 43 can then be loaded with the accessed operational settings or vehicle telematics unit 30 can verify that the module 43 has been previously programmed to operate according to the operational settings used in the country the vehicle 12 is located. In another implementation, the MCC code stored at the vehicle 12 can be compared with the detected MCC code. When the detected MCC code matches the stored MCC code at the vehicle 12, the method 200 can end because the Wi-Fi module 43 has been previously programmed with the operational settings for its location. On the other hand, when the detected MCC code and the stored MCC code do not match, the vehicle telematics unit 30 can then access the lookup table stored at the vehicle 12 and locate a match between the detected MCC and an MCC in the table. Once a match is found, the vehicle telematics unit 30 can, based on the frequency band used by the Wi-Fi module 43, identify the operating conditions permitted at the location represented by the detected MCC. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. For instance, terms like "geopolitical boundary" have been described with respect to a country. However, this term can also represent a continent, a group of countries, a state, a city, or similar defined land boundary. And while "geopolitical identifier" has been described in terms of an MCC, it should be understood that other identifiers, such as a SID, can be used to infer the location of the vehicle or the Wi-Fi module. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling Wi-Fi module operation based on vehicle location, comprising the steps of:
   (a) detecting at a telematics unit installed in a vehicle a geopolitical identifier broadcast by a wireless carrier system;
   (b) storing operational settings for a plurality of geopolitical identifiers in a lookup table at the vehicle;
   (c) determining whether operational settings of the Wi-Fi module conform to the stored operational settings specified for the detected geopolitical identifier; and
   (d) changing the operational settings of the Wi-Fi module when not conforming to the operational settings specified for the detected geopolitical identifier.

2. The method of claim 1, wherein the geopolitical identifier identifies a geopolitical boundary.

3. The method of claim 2, wherein the geopolitical boundary is a country.

4. The method of claim 1, wherein the geopolitical identifier further comprises a mobile country code (MCC) broadcast by the wireless carrier system.

5. The method of claim 1, wherein the operational settings of the Wi-Fi module further comprise a channel of the Wi-Fi module, a broadcast power level of the Wi-Fi module, or both.

6. The method of claim 1, further comprising the step of associating operational settings with a frequency band.

7. The method of claim 1, further comprising the step of detecting the geopolitical identifier at a vehicle telematics unit.

8. The method of claim 1, wherein the operational settings stored at the vehicle for each of the plurality of geopolitical identifiers include at least frequency bands available for use in each geopolitical entity, channels available within each of the frequency bands, and a broadcast power level for each of the channels.

9. A method of controlling Wi-Fi module operation based on vehicle location, comprising the steps of:
   (a) storing a geopolitical identifier at a vehicle, and storing operational settings for a plurality of geopolitical identifiers in a lookup table at the vehicle;
   (b) detecting at a telematics unit installed in the vehicle a geopolitical identifier broadcast by a wireless carrier system;
   (c) comparing the stored geopolitical identifier with the detected geopolitical identifier;
   (d) determining whether operational settings of the Wi-Fi module conform to the stored operational settings specified for the detected geopolitical identifier when the stored geopolitical identifier is different than the detected geopolitical identifier; and
   (e) changing the operational settings of the Wi-Fi module when not conforming to the operational settings specified for the detected geopolitical identifier.

10. The method of claim 9, wherein the geopolitical identifier identifies a geopolitical boundary.

11. The method of claim 10, wherein the geopolitical boundary is a country.

12. The method of claim 9, wherein the geopolitical identifier further comprises a mobile country code (MCC) broadcast by the wireless carrier system.

13. The method of claim 9, wherein the operational settings of the Wi-Fi module further comprise a channel of the Wi-Fi module, a broadcast power level of the Wi-Fi module, or both.

14. The method of claim 9, further comprising the step of associating operational settings with a frequency band.

15. The method of claim 9, further comprising the step of detecting the geopolitical identifier at a vehicle telematics unit.

16. The method of claim 9, wherein the operational settings stored at the vehicle for each of the plurality of geopolitical identifiers include at least frequency bands available for use in each geopolitical entity, channels available within each of the frequency bands, and a broadcast power level for each of the channels.

17. A system of controlling Wi-Fi module operation based on vehicle location, comprising:
- a vehicle telematics unit receiving a geopolitical identifier broadcast by a wireless carrier system and determining whether the geopolitical identifier is different from a previously-detected geopolitical identifier; and
- a Wi-Fi module located in a vehicle and in communication with the vehicle telematics unit, wherein the vehicle telematics unit directs the Wi-Fi module to change its operational settings based on a determination that the received geopolitical identifier is different than the previously-detected geopolitical identifier;
- wherein operational settings for a plurality of geopolitical identifiers are stored in a lookup table at the vehicle for directing the Wi-Fi module to change the operational settings.

18. The system of claim 17, wherein the geopolitical identifier further comprises a mobile country code (MCC) broadcast by the wireless carrier system.

19. The system of claim 17, wherein the operational settings of the Wi-Fi module further comprise a channel of the Wi-Fi module, a broadcast power level of the Wi-Fi module, or both.

20. The system of claim 17, wherein the operational settings are associated with a frequency band.

* * * * *